Sept. 5, 1967  R. L. SMIRL ET AL  3,339,575
CONTROL VALVE FOR AUTOMATIC CLUTCH CONTROL
Original Filed Aug. 2, 1961  3 Sheets-Sheet 1

Inventors:
Richard L. Smirl
Miczyslaw J. Waclawek
John W. Adelman and
Edward F. LaBuda
By: Joseph W. Malleck Atty.

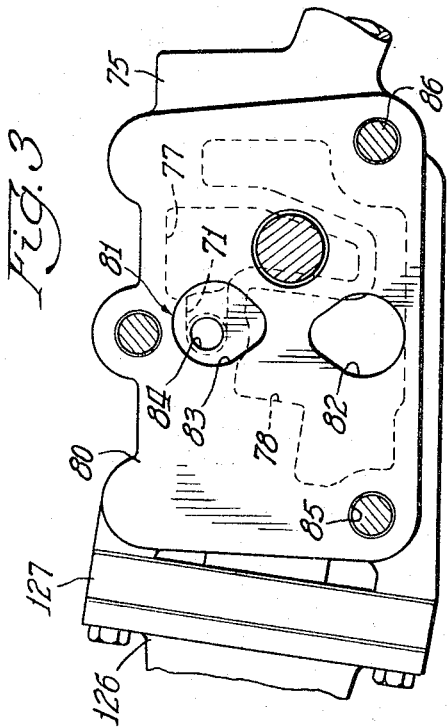
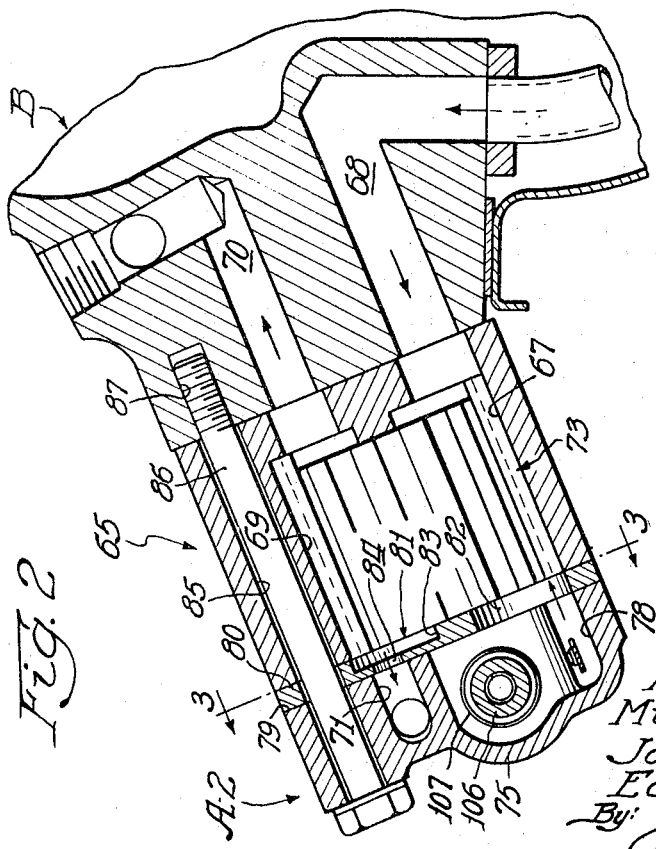

Sept. 5, 1967 R. L. SMIRL ETAL 3,339,575
CONTROL VALVE FOR AUTOMATIC CLUTCH CONTROL
Original Filed Aug. 2, 1961 3 Sheets-Sheet 3
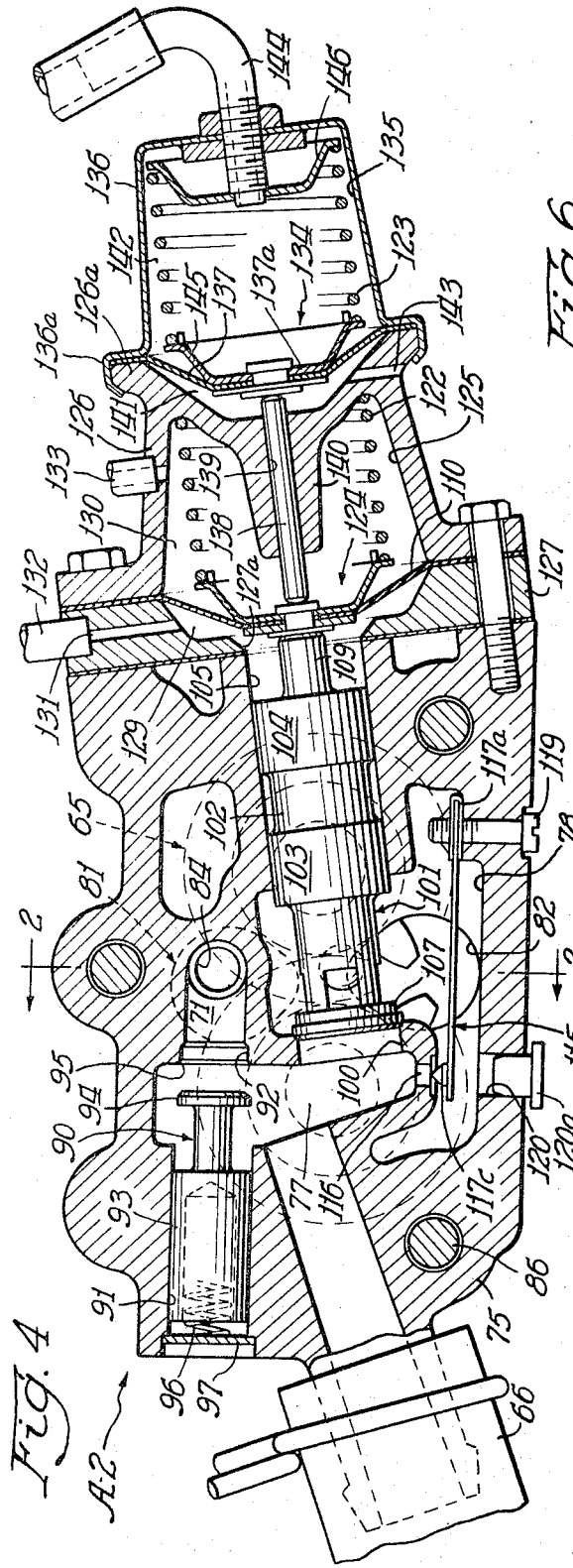
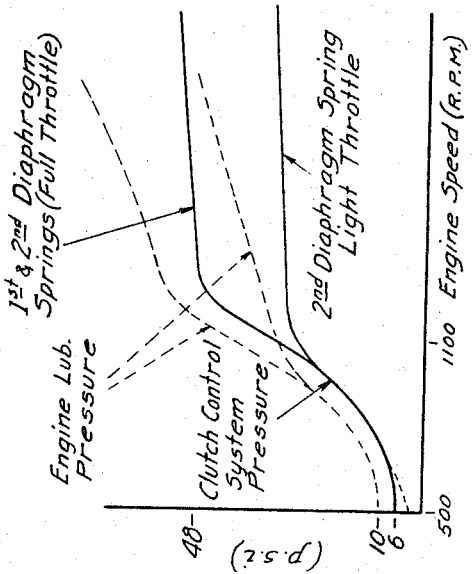
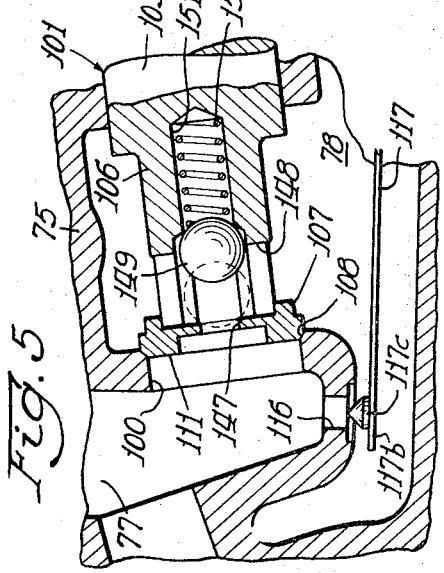
Inventors:
Richard L. Smirl
Mieczyslaw J. Waclawek
John W. Adelman and
Edward F. LaBuda
By: Joseph W. Mallich Atty.

United States Patent Office 3,339,575
Patented Sept. 5, 1967

3,339,575
CONTROL VALVE FOR AUTOMATIC
CLUTCH CONTROL
Richard L. Smirl, La Grange, Miczyslaw J. Waclawek, Olympic Fields, and John W. Adelman and Edward F. La Buda, Chicago, Ill., assignors to Borg-Warner Corporation, Chicago, Ill., a corporation of Illinois
Original application Aug. 2, 1961, Ser. No. 128,916, now Patent No. 3,263,782, dated Aug. 2, 1966. Divided and this application Dec. 9, 1963, Ser. No. 336,332
3 Claims. (Cl. 137—115)

This application is a divisional of parent application Ser. No. 128,916, filed Aug. 2, 1961, now Patent No. 3,263,782.

This invention relates to automatic clutch control mechanisms and more particularly to a control valve used with a fluid actuating means cooperating with an internal combustion engine for normally automatically engaging the clutch mechanism in response to engine speed and torque, and for automatically disengaging and reengaging the clutch mechanism in response to transmission shift means.

The clutch control system of the present invention is intended to provide most of the advantages of an automatic transmission, as well as the economy of a conventional clutch installation, by utilizing a conventional counter-shaft transmission in connection with a power actuated clutch. As with certain other automatic clutch systems, the need for a conventional clutch pedal is eliminated entirely.

In U.S. Patent No. 2,893,526, by R. L. Smirl, one of the co-inventors of the present invention, a basic disclosure of the instant type of clutch control system was made; such patent shall be hereinafter referred to as the original disclosure. The parent application, U.S. Ser. No. 128,196, is incorporated herein by reference. The instant invention is, therefore, directed to novel improvements over such construction and has as a primary object the provision of an improved clutch control system employing a unique control valve that is more effective to automatically disengage the clutch during the gear shifting operation and which permits more smooth and rapid reengagement after the gear shifting operation has been completed for all driving conditions.

One object of the present invention is to provide means for producing a light residual clutch engagement to take up the drive-line backlash in order to avoid a drive-line thump when the throttle is opened to start the car in motion; such means is adapted also to initiate clutch engagement when shifting to a lower gear at closed throttle for hill braking and engine braking while coasting on a level. Furthermore, when braking under ordinary conditions by use of the vehicle's brakes, the engine at first assists the braking action in the usual manner, but before the engine begins to "falter," the clutch disengages automatically so that all risk of stalling the engine is avoided.

The invention consists of the novel constructions, arrangements and devices to be hereinafter described and claimed for carrying out the above-stated object and such other objects as will appear from the following description of a preferred form and alternative suggestions of the invention illustrated with reference to the accompanying drawings, wherein:

FIG. 2 is a sectional view of the primary control valve taken substantially along line 2—2 of FIG. 4 and also illustrating a portion of the engine pumping system co-operating therewith;

FIG. 3 is a sectional view taken substantially along line 3—3 of FIG. 2 and illustrating the inner face of the primary control valve;

FIG. 4 is an enlarged elevational view, substantially in cross-section, of the primary control valve and vacuum-operated modulating means for the clutch control mechanism;

FIG. 5 is a still further enlarged fragmentary sectional view of a portion of the control valve of FIG. 4, illustrating primarily the by-pass port and speed responsive pressure control orifice with operative valving members;

FIG. 6 is a graphical representation of the fluid pressure supplied to the servo-motor as a function of engine speed plotted along the abscissa.

Figure 1:
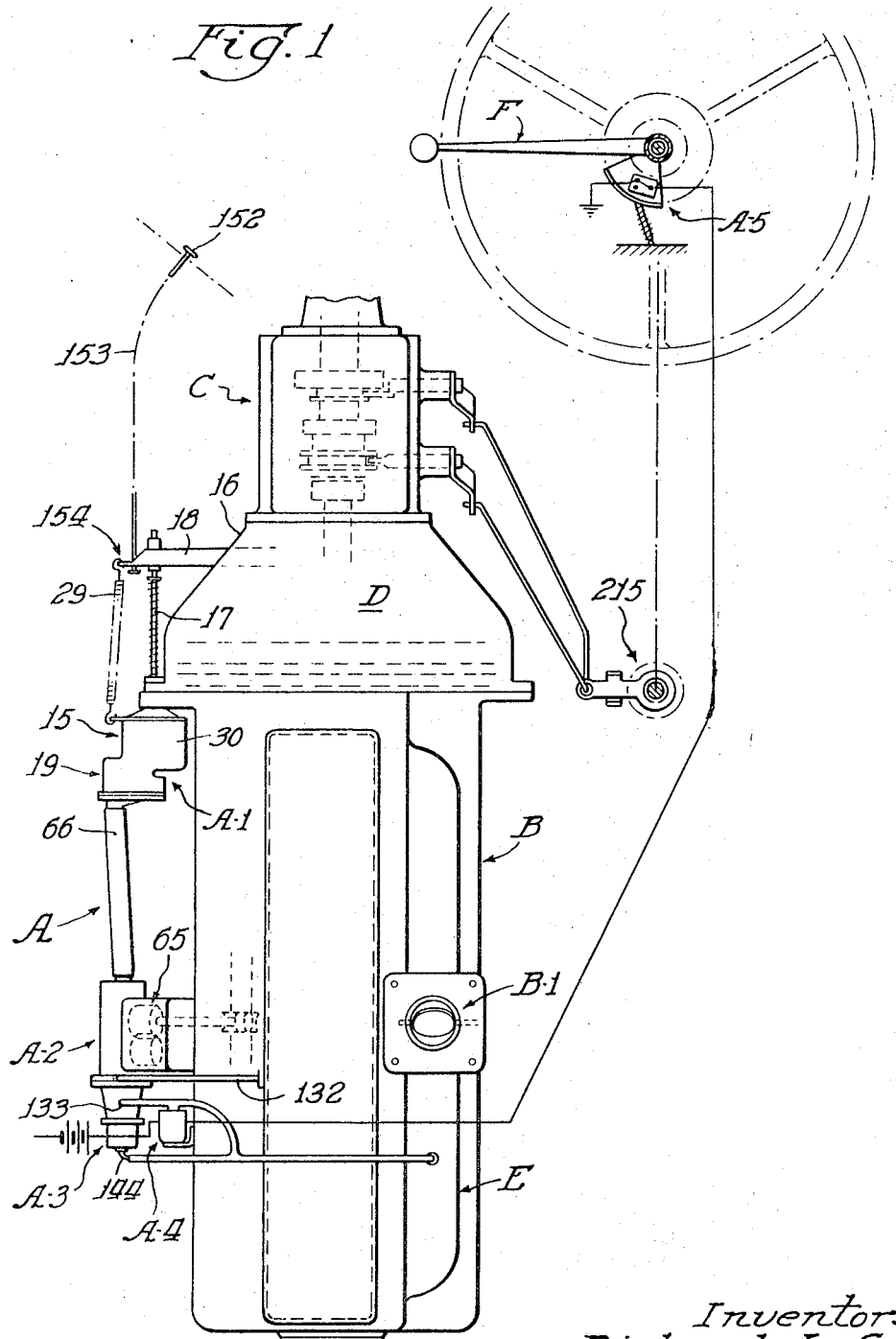
FIG. 1 is a plan view of a typical automobile power unit shown in conjunction with a schematic representation of a steering and gear-shifting mechanism, the novel clutch control mechanism of this invention being illustrated as incorporated therewith.

Illustrated in FIG. 1 is a preferred construction of a clutch control mechanism A embodying the improvements of this invention; the control mechanism is shown as mounted upon a power unit of a typical automobile with which the mechanism cooperates. The power unit comprises an internal combustion engine B controlled by a throttle B-1 and adapted to transmit torque to a conventional synchromesh counter-shaft transmission C through a friction-disc type clutch device D. The transmission C occupies but a fraction of the space normally occupied by a standard automatic hydraulic transmission and is subject to much less maintenance problems. As far as the driver of the automobile is concerned, the illustrated power unit transmits torque in a seemingly automatic fashion similar to a fully automatic transmission, by utilization of the improved clutch control mechanism A which is responsive to engine operation and to a change in the gear position of the transmission to automatically engage and disengage the clutch D.

The mechanism A, being highly economical, compact and of simple construction, generally comprises the following principal elements: a clutch actuating means A-1 for operating the clutch and actuated by engine lubrication oil pumped thereto, a primary control valve A-2 for regulating the oil pressure administered to the servo-motor and having a vacuum-operated modulating means A-3 connected to the engine manifold E, an electrically operated dump valve means A-4, and a switch means A-5 actuated by the gear-shift lever F operative through shift linkage 215 to effect a speed-ratio change in the transmission C. The control valve and dump-valve may each be conveniently mounted on the engine block or clutch housing and the control valve may be mounted on the engine lubrication pump in place of its pump cover plate; these mountings promoting the adaptability of the clutch control mechanism to most any automobile construction. The portions of mechanism A, comprising the primary control A-2, the modulating means A-3, the dump valve means A-4 and the switch means A-5 may be considered as an assembly or means for manually controlling or relieving the pressure in the clutch actuating means A-1 which has a fluid chamber regulating the engagement or disengagement friction device D.

To maintain the clutch D in the engaged condition for normal drive purposes, lubrication oil is pumped by the engine to the servo-motor A-1 and is maintained at an operative pressure level by control valve A-2 so as to apply sufficient clutch engaging force to meet varying driving needs. Upon a change in gear ratio of the transmission, the switch means A-5 automatically actuates the electrical dump valve A-4 to fully communicate the engine manifold E with the vacuum-operated modulating means A-3 for affecting valve A-1 in a manner to dump lubrication oil pressure to an engine sump chamber (not shown) and thereby disengage the clutch D with relief of pressure in the servo-motor A-1. Declutching takes place so rapidly that no difficulty is experienced even during the fastest gear changing. Reengagement of the clutch takes place as the shift lever completes its gear change stroke, whereupon the dump valve is deenergized.

The clutch actuating means A–1 for the clutch device D comprises a fluid-operated actuator or servo-motor 15 mounted on the housing 16 of the clutch device and has a thrust-rod 17 operatively connected to a clutch actuating lever 18; the fluid intake of the servo-motor is regulated by a fluid accumulator valve assembly 19 integrally affixed to the servo-motor.

Although not fully shown, the clutch device may be constructed in accordance with a clutch device as shown in U.S. Patent 2,253,344, issued 1941 by Nutt and Cook, which is a spring released and hydraulically engaged clutch; the clutch actuating lever 18 extends through an opening in the clutch housing 16 and is adapted to operatively and axially slide a bearing collar journaled to the clutch input shaft which in turn engages a plurality of operating levers which function to bring the friction members of the clutch device together for conjoint rotation. Upon deactivation of the servo-motor, a large tension coil spring 29 and assisted by internal springs of the clutch (not shown) returns the lever 18 to a position in which the clutch device is disengaged; the spring 29 is mounted with one end engaging the outer extremity of lever 18 and the other end engaging a portion of the servo-motor structure.

In FIGURE 2 is shown one portion of a fluid supply and pumping means 65, which is adapted to deliver lubricating oil through the primary control valve means A–2 and through conduit 66 (FIG. 1) to the accumulator valve assembly 19. More particularly, the fluid supply and pumping means 65 comprises a pump 73 of any suitable construction and arranged for drawing fluid such as lubricating oil from an oil reservoir or sump (not shown) by means of an inlet passage 68 leading to chamber 67 of the pump, and for delivering pressurized oil to an outlet chamber 69 in the pump. The outlet chamber is connected at one side to an engine lubrication conduit 70 and at the other side to an inlet chamber 71 in the primary control valve A–2. Conduit 70 and inlet passage 68 may be suitably formed by borings within the engine block adapted for alignment with the inlet and outlet of the pump 73; the pump may be driven by the crankshaft of the engine B in any suitable manner (not shown).

It should be indicated that the only passage subject to the time delay associated with the flow of viscous fluid in the control system is the conduit 66 which is actually made quite short (FIG. 1) by locating the primary control valve means A–2 close to or integral with the servo-motor A–1, all of the other passage between control members handle only a small displacement of fluid which results in almost instantaneous response.

The primary control valve means A–2 which is adapted to regulate the pressure of the oil flowing between the pump 65 and the servo-motor A–1, the oil pressure being used to hydraulically engage and disengage the clutch D in response to manual selection and, furthermore, to vary the clutch engaging force in sympathy with the varying conditions of the engine.

The control valve means comprises a housing 75 formed of cast material, such as aluminum, and has provided therein three major and irregularly shaped chambers; inlet chamber 71, control or sensing chamber 77, and exhaust chamber 78. One side 79 (FIG. 2) of the housing is formed substantially flat and is adapted to be mounted facing the pump; each of the indicated chambers are formed in the housing so that they may open outwardly upon the flat side 79 and have a terminal configuration within the plane of the flat side which is generally commensurate to the greatest dimensions of such chambers. This facilitates repair and easy access to the chambers. As shown in FIGS. 2 and 4, the housing is highly compact, having a thickness in the direction toward the engine which is equal to or less than one-half the length or height of the housing.

A flat housing plate 80, having a generally rectangular outer periphery similar in shape to the periphery of the flat side 79 of the housing, is adapted to be sandwiched between the flat side of the housing and the pump 73 during assemblage, as shown in FIG. 2. A pair of apertures 81 and 82 are formed in plate 80; aperture 81 is adapted to communicate the upper chamber 69 of the pump with the inlet chamber 71 of the housing 75. Aperture 81 has a stepped configuration including a pear-shaped large bore 83 adjacent chamber 69 and a smaller bore 84 adjacent chamber 71. As will be described subsequently, the smaller bore 84 functions as a restriction to control the supply of fluid to the clutch engaging system and at closed throttle position, clutch engagement is made somewhat softer. The bore 84 also functions to provide further increase in engine lubrication pressure with higher spreads in spite of the attainment of maximum pressure in the clutch system; this insures that the engine lub. pressure will always be greater than the pressure in the clutch system (see FIG. 6). Aperture 82 is generally pear-shaped and is adapted to communicate chamber 67 of the pump and the exhaust chamber 78 of the housing. Aperture 82 is sufficiently large so as not to affect the flow of the system.

A plurality of aligned openings 85 are provided in and through the housing 75, plate 80, and pump 73; each opening receives the shank of a mounting cap screw 86. The inner ends of each of the cap screws is adapted to be threadably received in a threaded bore 87 formed within the block of the engine.

To insure that the engine B will be supplied with sufficient lubricating oil before any oil is diverted to the servo-motor A–1, a pre-load or poppet valve 90 is slidably disposed within a cylindrical cavity 91 formed in the housing and communicating the exterior thereof with the control chamber 77. A regulator opening 92 is formed in the housing communicating the inlet chamber 71 and the control chamber; the opening 92 is generally aligned with the cavity 91. The pre-load valve 90 has a hollow cylindrical section 93 which slidably engages the walls of the cavity 91 and carries a valve head 94 extending axially therefrom and adapted to close off the opening 92 when seated against an annular valve seat 95 about the opening. The pre-load valve is normally urged into the closed position of opening 92 by a coiled compression spring 96 contained within the hollow interior of section 93 and acts between the preload valve and a cap 97 covering the exterior of cavity 91. The spring is adapted to provide a light load and allow the pre-load valve to open when a pre-determined relatively low pressure has been achieved in the inlet chamber 71. For purposes of the preferred embodiment, it is preferable to calibrate spring 96 to prevent oil from flowing into the control chamber 77 until generally 6 p.s.i. of pressure has been developed.

For effecting engagement of the clutch device and for regulating the pressure build-up in the control chamber 77, the housing 75 has formed therein a by-pass or discharge port 100 which has a generally large diameter so that the dimension of the port will not provide a restriction to flow through the system when fully open. The by-pass port communicates between control chamber 77 and exhaust chamber 78. A control valve assembly 101 is associated with the port 100 and comprises a valve member or element 102 having a pair of spaced lands 103 and 104 which are slidably disposed within a cylindrical cavity 105 formed in the housing and communicating the exterior of the housing with the exhaust chamber 78. One end of the valve member 102 has formed thereon a neck portion 106 which carries a valve head 107 adapted to seat against an annular valve seat 108 formed about the port 100; the port is adapted to be closed off when the valve member is in the position as shown in FIG. 4. The opposite end of the valve member has an extension 109, engaging diaphragm 110 which in turn is spring loaded to urge the valve member to the closed port position. The valve member is arranged so that the inner face 111 of the valve head is subjected to the pressure of the control chamber 77, wherefor the control valve assembly is caused to act as a pressure relief valve for the pump to prevent the build-up of excessive pressure in the engine lubrication system and in the clutch control system.

To simplify the establishment of clutch engaging pressure differing from that due solely to engine speed for certain of the high speed driving ratios and to eliminate requirements for rotating weights or valves, a by-pass speed responsive pressure control orifice construction is provided in the valve member 102 which is adapted to return the discharge of the engine driven pump back to the pump in a predetermined flow manner. To this end, a thin plate orifice 147 is centrally provided in the valve head 107 and communicates with diametrically extending bore 148 opening into exhaust chamber 78. The bore is made sufficiently large so that it will offer relatively no restriction to flow compared to the by-pass orifice, the orifice will modulate the pressure increase in the control chamber in a manner such that the increase in engagement pressure transmitted to the servo-motor will vary approximately in proportion to the square of the engine speed so that the effect is almost identical in clutch engagement with an arrangement of a centrifugal clutch for controlling clutch engagement pressure.

At engine idle, when the transmission is in gear, it is very desirable to have the clutch device slightly dragging in order to utilize the engine as a braking means during hill coasting and to take up the phenomenon of drive line back-lash when fully engaging the clutch and thereby avoid initial thump. To initiate such slight drag on the clutch, the pressure in the control chamber must be maintained slightly higher than necessary to overcome the force of the retractor spring and the springs within the clutch device itself. This requires some means for augmenting the pressure in the control chamber, assuming that the orifice size is predetermined to give a reasonable full throttle stall speed and the retractor spring is calibrated to give a sufficient and quick release upon dissipation of pressure in the control chamber. To meet such requirement, the by-pass orifice is adapted to be closed by a pre-loaded valve 149 in the form of a ball and is urged toward closing position by a coil spring 150 acting between one end of the bore 151 provided in the valve member 102 and one side of the ball pre-load valve. Such spring acts upon the pre-load ball valve to set a low limit on the pressure within the control chamber when the valve member closes off the release port 100.

It is desirable, however, to limit the initial idling engagement to about 6 ft.-lb. of torque (or 6–8 p.s.i.) to avoid appreciable creep after the vehicle is stopped in low gear and to avoid engine "throb" when standing in gear.

Thermostatically controlled means 115 is provided within the housing 75 for controlling a limited flow of fluid from the control chamber 77 to the exhaust chamber 78 and thereby to the inlet side of the pump. Herein such means comprises an opening 116 communicating chambers 77 and 78 and a thermostatic valve member 117 which is mounted in chamber 78 and adapted to close off opening 116. Member 117 comprises a bi-metallic strip having one end 117a secured to the inner wall of chamber 78 by a suitable fastener 119 and an opposite end 117b which carries a conically shaped plug 117c arranged to restrict the opening upon movement or flexing of strip 117 in response to changes in temperature of the oil. The construction and arrangement of the thermostatic valve means 115 is such that the fluid pressure drop across the by-pass port will be the same regardless of changes in the viscosity of the lubricating oil by changes in its temperature for any given pressure in the chamber 77. A change in temperature of the lubricating oil will cause the bi-metallic strip to change its shape and thereby to move the plug 117c to or from the opening 116. Thus, the pressure drop across the by-pass port is substantially unaffected by changes in oil temperature so that there will be no alteration in the control characteristics between the period of starting with a cold engine and operation after the engine has warmed up.

A drain opening 120 is provided in housing 75 and is normally closed by stopper 120a; such drain opening facilitates removing all fluid from the chamber 78 as desired.

Referring again in particular to FIG. 4, an actuating mechanism is shown for purposes of operatively moving the valve member 102. The actuating mechanism is principally comprised of a plurality of coil springs 122 and 123 which are adapted to urge the valve member to a closed position. To over-ride one or more of these springs, a vacuum operated modulating means is incorporated as part of the mechanism. In reference first to the apparatus cooperating with the spring 122, there is a diaphragm assembly 124 disposed in a chamber 125; the chamber 125 is formed by a cup member 126 and a coupling plate 127 having a central opening 127a and which is sandwiched between the cup member and the control valve housing 75. Between the cup member and the coupling plate 127 is clamped the outer margin of the flexible diaphragm 110 which has its central portion connected to the neck 109 of the valve member 102. The diaphragm 110 divides the chamber 125 into a first chamber portion 129 and a second chamber portion 130. The first chamber portion 129 communicates with the atmosphere by means of a passage 131 in connection with a conduit 132 leading to the valve cover of the engine in order to dispose of oil vapor formed in the first chamber portion. The second chamber portion 130 is arranged for selective communication with the engine manifold E by means of a duct 133.

The spring 122 is disposed within the second chamber portion 130 and is adapted to axially urge the central portion of the diaphragm 110 and therefore the valve member 102 toward the closed port position.

A second diaphragm assembly 134 is provided and comprises a second chamber 135 formed between a cup element 136 and the exterior of the cup member 126. The cup element 136 has a lip portion 136a which is secured to an annular flange 126a of the cup member. In similar fashion to the first assembly, a second flexible diaphragm 137 has its outer annular margin clamped between the cup member and the cup element and has a central portion 137a engaging a rod 138 which is slidably disposed within a bore 139 formed within a neck 140 of the cup member. The rod has a touching engagement with the first diaphragm and in effect provides a lost motion connection between the diaphragms. Spring 123 acts betweene a pair of brackets 145 and 146, respectively secured to the end of the cup element and the diaphragm, to augment the first spring and urge the valve member 102 into closing position when permitted by pressure on the diaphragm 137.

The chamber 135 is in general axial alignment with the first chamber 125; the diaphragm 137 divides the chamber into a first chamber portion 141 and a second chamber portion 142. The first chamber portion 141 communicates with the atmosphere through a passage 143, and the second chamber portion 142 communicates with the intake manifold E of the engine by means of a duct 144.

The construction and arrangement of the actuating mechanism is such that vacuum in the chamber portions 142 and 130 will tend to urge the respective diaphragm assemblies in a direction against the action of the compression springs 122 and 123 which normally provides a closing force acting on the valve member 102.

Manual lockout means are provided in order to allow manual engagement of the clutch device when desired. Such means is in the form of a lock-out button 152 which may be placed on the vehicle dashboard or in any other position accessible to the driver. The button 152 is connected by a cable 153 and other linkage (not shown) to a catch mechanism 154 which extends through an opening in the lever 18 of the clutch device and a shoulder adapted to engage the lever upon movement of the lock-out button into operative position.

*Operation*

The operation of the clutch control mechanism may be seen by following through a typical example. Assuming that the engine B is started and warmed up to normal operating temperature and idling speed, the engine driven pump and supply means 65 will deliver fluid from passage 68, to pump chamber 69, and then into the inlet chamber 71 of the primary clutch control housing 75. Further, assume that the throttle of the engine is relatively closed. When the oil pressure in passage 70, chamber 69, and chamber 71 of the clutch control housing have reached the pre-determined required operating pressure for the other controls of the vehicle and is sufficient to lubricate the engine, the pre-load valve 90 will open and full delivery of the pump will be available to produce pressure against the piston of the servo-motor 15.

The dump valve is energized which permits vacuum pressure to be communicated to the vacuum servo-motor or diaphragm assemblies of A–3. Both of the diaphragm assemblies thereby have a pressure differential across them which permits the valve member 102 to move away from port 100 thereby permitting fluid in the control chamber 77 to return to the chamber 67 of the pump.

Moving the throttle to a more open position will necessarily reduce the amount of vacuum to which the second diaphragm assembly will be subjected. Thus, as the engine speed increases, thereby requiring a greater clutch engaging force, the reduced vacuum will permit a greater effective spring force to urge the valve 102 closed and raise the pressure on control chamber 77.

In the initial stages of moving into first gear position, and with the control valve closed, available pressure will be delivered to the accumulator valve from chamber 77 through conduit 66 to the inlet passage 42 of the accumulater valve assembly 19.

The amount of pressure within the servo-motor A–1 and which is available for providing a clutch engaging force will build up in a manner as graphically shown in FIG. 6. Between generally zero and 6 p.s.i. in control chamber 77, not only will the relief port be closed but the by-pass orifice within valve member 102 will be closed by the ball check valve thereby causing the pressure built up in chamber 71 to be substantially linear as engine speed increases. Above a certain pressure, here chosen as 6 p.s.i., the ball check valve will open and thereafter pressure build up will be in accordance with engine speed as modulated by three other factors.

First, the engaging pressure will vary in accordance with the torque being supplied by the engine B since an increase in engine torque is manifested by an increase in the engine manifold pressure (or decrease in manifold vacuum) which is supplied to the second diaphragm assembly 134. Thus, a high engine torque will result in a pressure in the second chamber portion 142 which will be close to atmospheric; substantially, the full effect of the second spring 123 will be employed in augmenting the holding of the valve member 102 in the closed position. A decrease in engine torque will result in a decreased pressure to counteract some or all of the effect of the second spring 123 to decrease the closing effort exerted on the valve member 102 and thereby allow fluid pressure in the control chamber to be more readily bypassed to the exhaust chamber and thence to the chamber 67 of the pump. Thus, a gradual increase in engaging pressure is afforded by the opening of the throttle B–1. It will be readily seen that this is a very desirable feature in that the clutch will be engaged by greater force when a greater engagement force is required such as when a greater amount of torque is being transmitted from the engine B through the clutch device and the transmission C to the vehicle driving wheel.

This variation in amount of vacuum which will regulate the amount of spring pressure acting on the valve member 102 at all times will provide a variance in the leveling-off pressure which is achieved when the pressure in the sensing chamber equals the available spring force to open port 100. This is clearly shown in FIG. 6. If the accelerator pedal is not depressed, the throttle will be relatively closed and the torque of the engine will be correspondingly low; this will produce a high vacuum in the chamber portion 142 to take out completely the second spring and thus permit only the spring 122 to regulate the maximum pressure in the control chamber. (The maximum engaging pressure achieved under light throttle is that indicated 2nd diaphragm spring.)

In the fully opened position of the throttle a minimum amount of vacuum will be applied to the chamber portion 142 thereby permitting substantially both springs to act against the valve member 102 and maintain a higher maximum pressure in the sensing chamber, labeled 1st and 2nd Diaphragm Springs in FIG. 6. Any intermediate position of the throttle will accordingly achieve intermediate leveling off of the sensing chamber pressure.

A second modulating factor on the pressure build-up is construction of the by-pass orifice. As has been indicated earlier, the provision of the by-pass orifice provides for an immediate clutch drag when the vehicle is started in first or reverse. Since the pressure drop through the orifice varies directly as the square of the flow rate therethrough (flow through a thin plate orifice) and since the pump means 65 tends to increase the flow delivered to the control chamber 77 directly with increase in engine speed, the by-pass orifice will modulate the pressure increase in the sensing chamber 77 in a manner such that the increase in engagement pressure transmitted to the servo-motor 15 will vary approximately in proportion to the square of the engine speed. Such increase will graphically be parabolic as shown in FIG. 6. Thus, the engine cannot stall and cannot run too fast when the thin plate by-pass orifice is properly calibrated.

While the car is in gear, and the vehicle is coasting on a level the throttle position is very light, thereby producing a large vacuum, it is desirable to employ the engine braking effect. To do so, there must be a residual pressure maintained in the control chamber to provide adequate clutch drag. In such a situation, it is desirable that the clutch drag be sufficient to maintain a power train between the wheels and the engine, regardless of the speed of the vehicle. To this end, the ball check valve controlling the by-pass orifice closes under influence of spring to insure a residual pressure here approximately 6 p.s.i.

The check valve is also useful in maintaining a residual pressure so that at engine idle, drive-line backlash will be taken up by having the clutch dragging to avoid any initial take-up thump when the clutch is positively engaged. The ball check-valve maintains the pressure in the control chamber slightly higher than that necessary to overcome the retractor spring 29 and springs in the clutch.

In the instance where the engine is started and gear shifting takes place when the engine oil is cold, the thermostatic valve means 115 is actuated by the cold oil to open port 116 in the clutch control outlet 75 so that the heavier oil is permitted to drain outwardly and return to the pump to compensate for the excess viscosity. Similarly, the serve-motor housing is provided with a temperature responsive valve which permits oil to drain or fill through an extra opening to compensate for the added heavier viscosity of the oil. The amount each of these openings will be unrestricted depends upon the position of the thermostatic valve and the corresponding temperature.

While I have described by invention in connection with certain specific constructions and arrangements, it is to be understood that this is by way of illustration and not by way of limitation and the scope of my invention is defined solely by the appended claims which should be construed as broadly as the prior art will permit.

We claim:

1. Mechanism for controlling engagement of a friction engaging device arranged to provide for transmission of torque between a drive member and a driven member, comprising means for supplying pressurized fluid, a casing having a control chamber for receiving the pressure fluid means for applying engaging force to the engaging device graduated in accordance with the fluid pressure in said chamber, manually controlled means for relieving the pressure in the said chamber for disengaging the friction device, and a primary valve control means for regulating the fluid pressure in said chamber, said control means being particularly characterized by a by-pass orifice provided in said casing and communicating said chamber with said supply means so that pressure in said control chamber will build up parabolically in accordance with increase in pressure of said supply means, and a pre-load valve means adapted to maintain said orifice closed until a predetermined pressure is reached thereby enabling the friction engaging device to be lightly engaged when the pressure of said supply is substantially reduced.

2. In a clutch control mechanism having a primary control valve means, a housing for said means, comprising: a casing having at least one side substantially flat and having means defining a sensing chamber and an exhaust chamber, each of said chambers being formed so that they open outwardly upon said flat side and a terminal configuration generally commensurate with the greatest lateral dimension of said chambers, said housing having means fluidly communicating said exhaust and sensing chambers, and means defining an inlet to said sensing chamber, said housing having means providing a passage directly communicating the exterior of said casing and the sensing chamber; and a plate adapted to be secured to said casing and fit flush against said flat side, said plate having a first opening thereto in alignment with said inlet means of said casing and a second opening therethrough aligned with the exhaust chamber.

3. In a clutch control mechanism having a primary control valve means, a housing as in claim 2 in which the first opening of said plate is stepped and is comprised of a first bore and a second bore which is adapted to provide a maximum limit upon flow therethrough.

References Cited
UNITED STATES PATENTS

| | | | |
|---|---|---|---|
| 2,835,266 | 5/1958 | Morte | 137—115 X |
| 2,971,523 | 2/1961 | Dudley | 137—115 X |

WILLIAM F. O'DEA, *Primary Examiner.*

D. MATTHEWS, *Assistant Examiner.*

UNITED STATES PATENT OFFICE
CERTIFICATE OF CORRECTION

Patent No. 3,339,575                          September 5, 1967

Richard L. Smirl et al.

It is hereby certified that error appears in the above numbered patent requiring correction and that the said Letters Patent should read as corrected below.

Column 10, line 4, after "and" insert -- have --; line 5, after "terminal configuration" insert -- in the plane of said flat side --.

Signed and sealed this 15th day of October 1968.

(SEAL)
Attest:

Edward M. Fletcher, Jr.

Attesting Officer

EDWARD J. BRENNER

Commissioner of Patents